United States Patent [19]
Pawlak et al.

[11] Patent Number: 5,038,066
[45] Date of Patent: Aug. 6, 1991

[54] CLAW POLE ROTARY ACTUATOR WITH LIMITED ANGULAR MOVEMENT

[75] Inventors: Andrzej M. Pawlak, Troy; David W. Graber, Millington; Jeffery A. Zuraski, Saginaw, all of Mich.

[73] Assignee: General Motors Corporation, Detroit, Mich.

[21] Appl. No.: 580,982

[22] Filed: Sep. 12, 1990

[51] Int. Cl.⁵ .............................................. H02K 1/22
[52] U.S. Cl. ................................... 310/263; 180/142; 180/143; 310/116
[58] Field of Search ..................... 310/263, 116, 36–38, 310/72, 75 R; 180/142, 148; 335/272, 277

[56] References Cited

U.S. PATENT DOCUMENTS

| | | | |
|---|---|---|---|
| 2,873,412 | 2/1959 | Pratt | 335/272 |
| 4,488,075 | 12/1984 | DeCesare | 310/263 |
| 4,644,246 | 2/1987 | Knapen | 310/75 A |
| 4,886,138 | 12/1989 | Graber et al. | 180/142 |

*Primary Examiner*—William H. Beha, Jr.
*Assistant Examiner*—Matthew Nguyen
*Attorney, Agent, or Firm*—Mark A. Navarre

[57] ABSTRACT

An actuator has a permanent magnet ring with a plurality of radially magnetized poles rotatably positioned between a pair of toothed pole pieces with interdigitated teeth, an electromagnetic coil and pole elements coupling the coil flux to the pole pieces. The pole pieces may themselves be rotatable or stationary. The permanent magnet circuit attempts to move the magnet ring to a first position relative to the pole pieces, and the electromagnetic circuit, depending on the direction of current in the coil, torques the magnet in one direction or another toward stable positions on either side of the first position. The device is used as a two or three position actuator or as an actuator operating against an external force and seeking a position as a function of current.

9 Claims, 3 Drawing Sheets

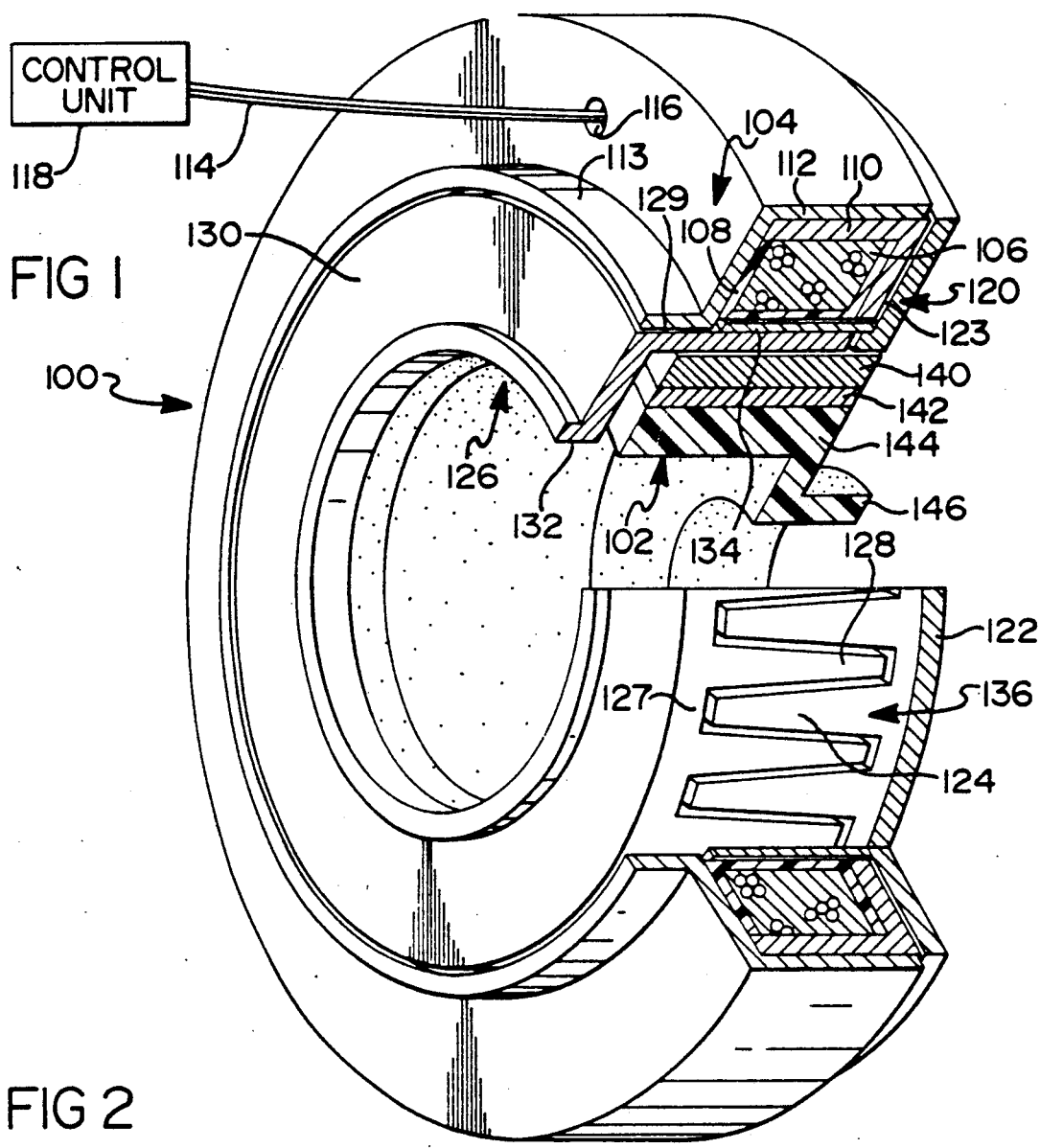
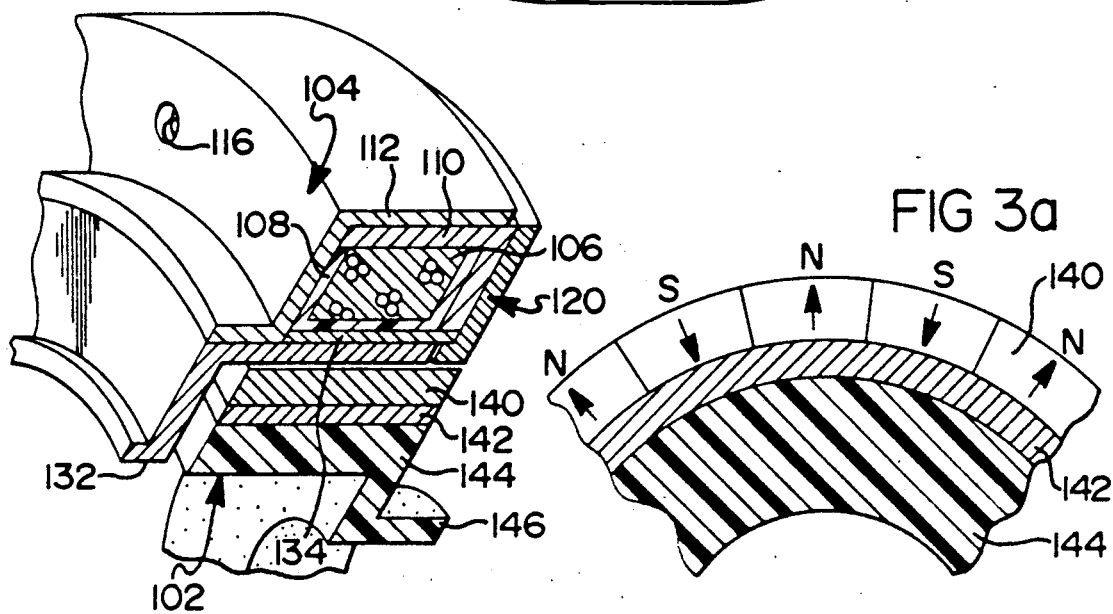

CLAW POLE ROTARY ACTUATOR WITH LIMITED ANGULAR MOVEMENT

FIELD OF THE INVENTION

This invention relates to a rotary actuator, and more particularly, to a claw pole actuator having a limited angular movement in response to an electrical energization.

BACKGROUND OF THE INVENTION

Torque motors working as magnetic springs can be used for applications requiring rotary motion to develop torque with a limited angle of rotation. Magnetic springs accomplish this through attractive and repulsive electromagnetic torques of the rotor with respect to the stator. In some particular cases, an additional rotation of the stator is required, that is, both the rotor and the stator can rotate. The additional degree of mechanical freedom should not affect the level of the electromagnetic torque developed in both directions of rotation for completed revolutions.

Our U.S. Pat. No. 4,886,138 issued Dec. 12, 1989, to Graber et al. entitled "Electromagnetic Control Apparatus for Varying the Driver Steering Effort of a Hydraulic Power Steering System", is an application of one version of an actuator utilizing the principles of this invention. In particular, it has two degrees of freedom for conjoint rotation of the rotor and stator, as well as magnetically variable torque developed between the rotor and stator as a function of relative displacement and energizing current. The mechanism is used in conjunction with a torsion bar to center two portions of a power steering valve. By varying the current to the electromagnetic coil, the net centering force on the valve is varied and the steering effort is therefore controlled.

The magnetic springs can be used, of course, with a one degree of freedom configuration where the stator is stationary and only the rotor moves. Further, since the direction of torque is dependent on the direction of energizing current, the actuator can be used effectively to develop torque in either direction with respect to a center position. This leads to application as a three position actuator having stable states when centered or when driven to extreme positions on either side of center. The actuator can also be configured to seek an off-center position as a function of current where the actuator movement is restrained by an external spring force such that for a given current there is a specific position where the torque balances the spring force.

The electromagnetic mechanism of this invention includes a permanent magnetic circuit and an electromagnetic circuit. The permanent magnetic circuit comprises a pair of relatively rotatable elements, one of which is toothed to conduct magnetic flux and one of which includes permanent magnets for establishing a permanent magnet coupling. The electromagnetic circuit comprises an energizing coil and an external magnetic circuit and also shares the toothed element.

In one illustrated embodiment, the toothed element is defined by a pair of spaced magnetic pole pieces with a total of N circumferentially spaced interdigitated teeth to form an annular claw pole structure, and the permanent magnet element is defined by a ring element rotatably disposed inside the claw pole structure for flux coupling with the teeth. The ring magnet is supported for rotation with an output shaft and the pole pieces are supported for rotation with another shaft. The ring magnet has N alternating polarity radially magnetized regions (poles) about its outer circumference. Adjacent permanent magnet regions are magnetically coupled either internally or by an external flux conducting ring, and the interdigitated teeth are disposed in close proximity to such regions to define a working air gap therebetween. The electromagnetic circuit comprises at least one annular exciting coil disposed about the pole pieces and ferromagnetic pole elements positioned adjacent the magnetic pole pieces to couple flux from the exciting coil to the pole pieces.

The above elements define two magnetic flux paths: a permanent magnet flux path which includes (neglecting leakage flux) only the rotary magnet ring and the pole pieces; and an electromagnetic flux path which includes the coil, pole elements, the pole pieces and the magnet ring. When there is no energizing current in the exciting coil, the magnet ring moves to a stable position relative to the pole pieces, such that the center of each magnet region is aligned with a gap between the interdigitated teeth. Stated another way, the interfaces between magnet regions will be aligned with the centers of the pole piece teeth.

When the exciting coil is energized with direct current, the interdigitated teeth define N alternating polarity electromagnetic poles which interact with the poles of the permanent magnet. The flux path circles the coil, passing through the electromagnetic and permanent magnet poles and the pole piece. Each tooth assumes a polarity, depending on the direction of energizing current, which attracts a magnet region of opposite polarity and repels adjacent regions of like polarity, causing a torque from the center position toward a position where the center of each permanent magnet region is aligned with the center of a tooth. The direction of energizing current determines the direction of torque from the center position. The magnitude of the current and the displacement from the center position determine the amount of torque. This device has three stable positions and is ideally suited as a three position actuator. As will be further described, the device can be configured as a two position actuator or as an actuator which is positioned in accordance with the magnitude and direction of the energizing current.

In another embodiment, the pole pieces are stationary instead of being fixed to a rotatable shaft, thus offering one degree of freedom instead of two. The principle of operation is the same in either case.

BRIEF DESCRIPTION OF THE DRAWINGS

The above and other advantages of the invention will become more apparent from the following description taken in conjunction with the accompanying drawings wherein like references refer to like parts.

FIG. 1 is a partly broken away isometric view of a rotary actuator according to the invention.

FIG. 2 is a partial isometric view of a rotary actuator according to another embodiment of the invention.

FIGS. 3a and 3b are partial cross-sectional views of magnet rings for the actuator according to the invention.

DESCRIPTION OF THE INVENTION

Figure 3B:
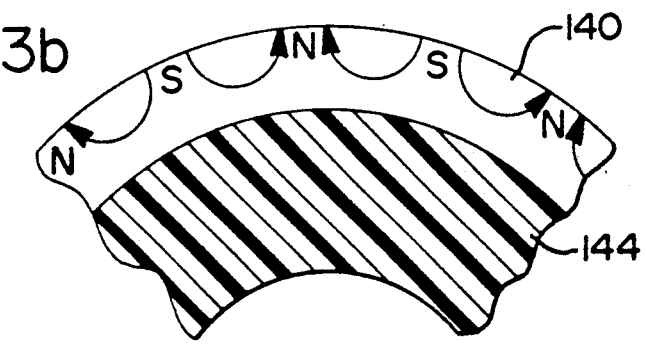

Referring to FIG. 1, an electromagnetic actuator 100 comprises a permanent magnetic circuit 102 and an electromagnetic circuit 104. The electromagnetic circuit 104 comprises an annular exciting coil 106 wound around the permanent magnet circuit 102 on a bobbin 108 and two partially encircling ferromagnetic pole elements 110 and 112 which are stationary. The pole element 112 has an outwardly extending flange 113. The pole elements 110 and 112 together define a structure having a U-shaped cross section surrounding the outer periphery and the sides of the coil 106 and extending radially inward along the permanent magnetic circuit 102 for coupling flux thereto. The lead ends 114 of coil 106 pass through a suitable opening 116 in the pole elements and are connected to a control unit 118 which supplies DC current to the coil 106. A first ferromagnetic pole piece 120 has an annular plate 122 in close proximity to the pole element 110 to form a small gap 123, and a plurality of poles or teeth 124 extending axially from the inner edge of the plate 122 to a position radially inward of the coil 106.

A second ferromagnetic pole piece 126 has a plurality of poles or teeth 128 interdigitated with and spaced from the teeth 124. A root portion 127 of the teeth 128 is spaced from the flange 113 of pole piece 112 by a small gap 129. The teeth 128 are attached via the root portion 127 to an annular plate 130 which extends radially toward the center of the actuator and terminates in a hub 132. A band 134 of nonmagnetic material surrounds the teeth of the pole pieces 120 and 126 to tightly bind them together to form an integrated claw pole unit 136. The gap 129 extends between the the band 134 and the bobbin 108. The claw pole unit 136 is then free to rotate, being driven or positioned by an external agent through the hub 132, or alternatively, driving the hub 132 through actuator forces.

In an alternate structure, shown in FIG. 2, the pole pieces 120, 126 closely engage the pole elements 110, 112 to eliminate the gaps 123 and 129 and thus are stationary. In this case the pole elements 110, 112 and the pole pieces 120, 126 form a stationery outer housing or support for the actuator. The permanent magnetic circuit 102 comprises a permanent magnet ring 140 and the pair of ferromagnetic pole pieces 120 and 126. The magnet ring 140 is radially magnetized to define N alternating polarity permanent magnetic poles about its outer circumference. This may be achieved with a radially magnetized magnet 140 as schematically depicted in FIG. 3a, supported on a flux conduction backing ring 142. The backing ring 142 magnetically couples opposite polarity poles of the magnet ring 140. The combination of the magnet ring 140 and backing ring 142 is supported for rotation with a nonmagnetic hub 144. A central axial extension of the hub 144 comprises an output shaft 146.

Alternatively, the magnet ring 140 may be internally magnetized, as schematically depicted in FIG. 3b, in a series of U-shaped patterns so that all of the magnetic poles are defined on the outer circumference of the magnet. In this case, a flux conducting backing ring, such as the ring 142 of FIG. 3a, is not required and the magnet 140 may be supported directly on the nonmagnetic hub 144.

The claw pole pieces 120, 126 each have N/2 axially extending claw pole teeth 124, 128 which are interdigitated to define a total of N electromagnetic poles in a cylindrical array disposed radially outboard of the magnet ring 140. The number N of magnet poles establishes the pole pitch PP and is determined by the required relative displacement. As will be seen, the actuator movement is limited to ½ pole pitch (PP/2) or less. If N equals 20, for example, ½ pole pitch corresponds to 18 mechanical degrees. The teeth are disposed in close proximity to the outer radial circumference of the ring magnet 140, defining a working air gap therebetween. When the exciting coil 106 is energized with direct current of a first polarity, the teeth 124, 128 assume alternate magnetic polarities, as indicated in the linearized representations of FIGS. 4a-4d, and magnetic flux flows in a flux path comprising the magnet 140 and backing ring 142, the pole piece 120, the pole elements 110, 112 and the pole piece 126.

Figure 4A:
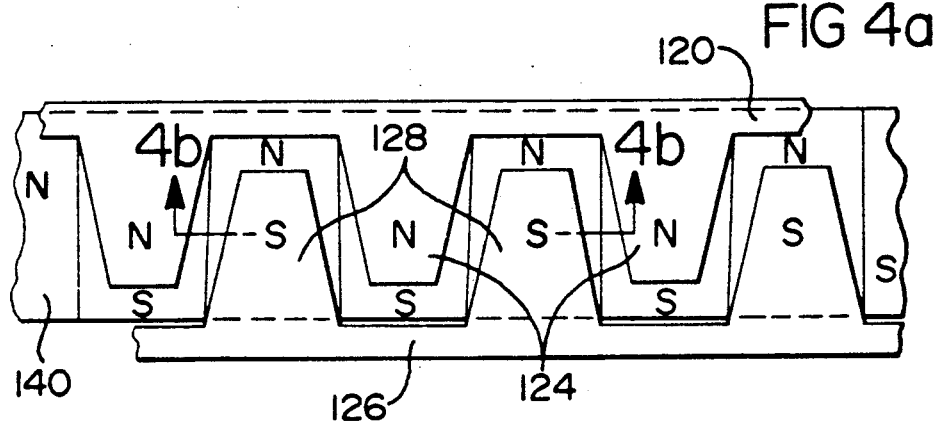
FIGS. 4a, 4b, 4c and 4d are schematic diagrams depicting linearized views of the electromagnetic and permanent magnet poles of the actuator of FIG. 1.
Figure 4B:
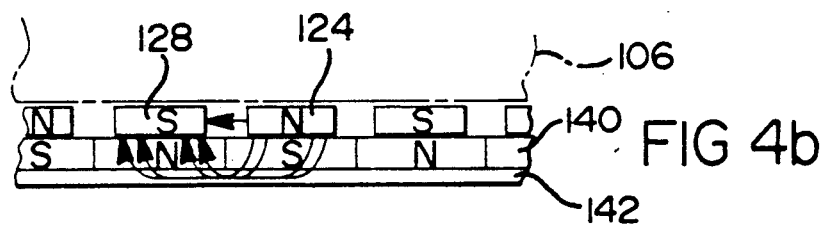

Referring to FIGS. 4a and 4b, which represents the case where the coil 106 is energized by direct current of a first polarity and the magnet ring 140 has moved to a state of stable equilibrium, the permanent magnet poles are aligned with the claw pole of opposite polarity. The flux circles the coil 106, crossing the working air gap between the north polarity teeth 124 and the south polarity permanent magnet poles, through the backing ring 142, and back across the working air gap between the north polarity permanent magnet poles and the south polarity teeth 128. For this particular coil energization, this state is magnetically preferred because it presents the lowest reluctance path for the magnetic flux.

Figure 5:
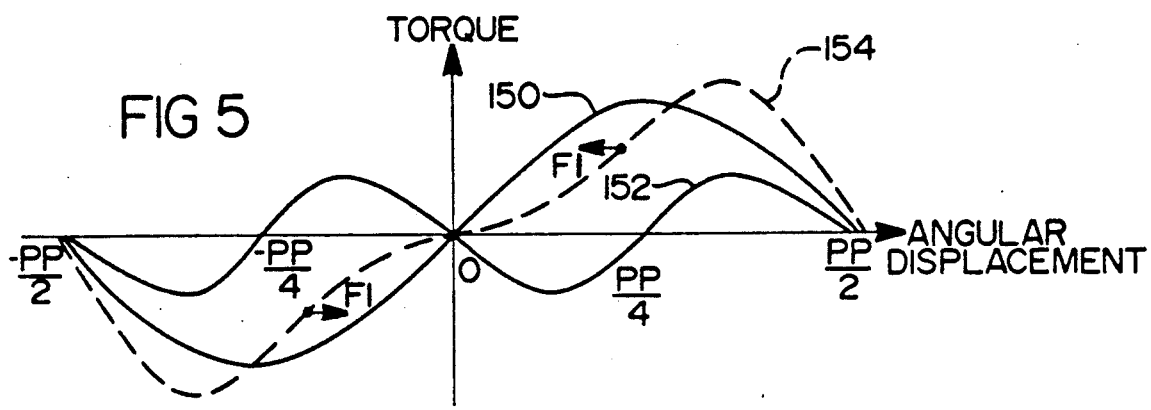
FIGS. 5 and 6 are torque-displacement curves for the actuator according to the invention for current flow in each direction.

In the torque-displacement diagram of FIG. 5, the electromagnetic force on the ring magnet is shown by trace 150, the force of the ring magnet interaction with the pole teeth is shown by trace 152, and the net force is shown by the dashed line 154. When the trace is above the x-axis the force F is toward the left and when it is below the axis the force F1 is toward the right as shown by the arrows F1. The stable condition of FIGS. 4a and 4b is here chosen as the zero displacement position. When the ring magnet 140 is displaced from the zero position by an amount less than PP/2 in either direction, a force toward the zero position is developed, the amount of force being a function of the angular displacement and the current magnitude.

Figure 4C:
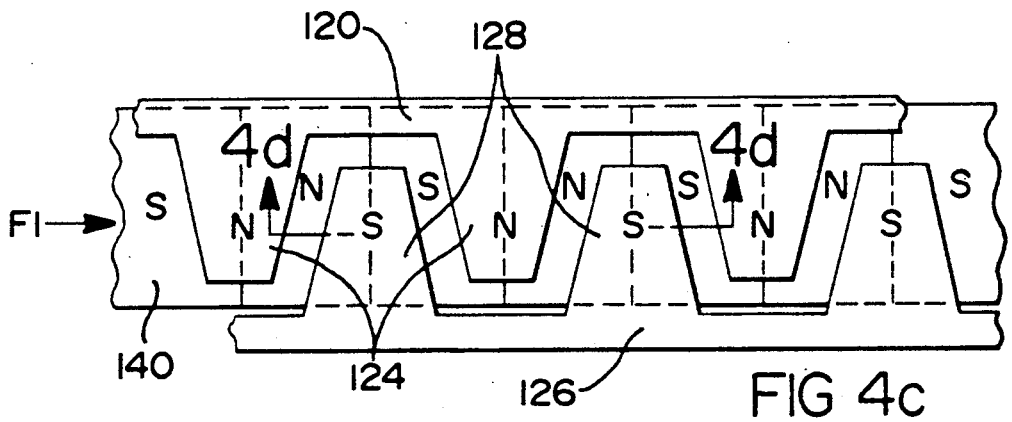
Figure 4D:
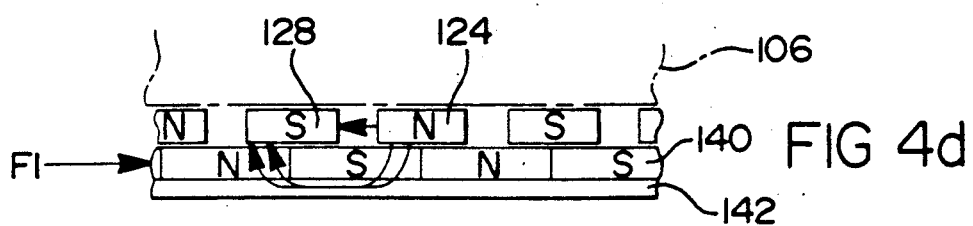

FIGS. 4c and 4d show the ring magnet 140 displaced an amount PP/4 to the left of the FIG. 4a zero displacement position, and thus a force F1 is developed to push the magnet toward the right. At a displacement of PP/2 the rotary magnet is in unstable equilibrium.

Figure 6:
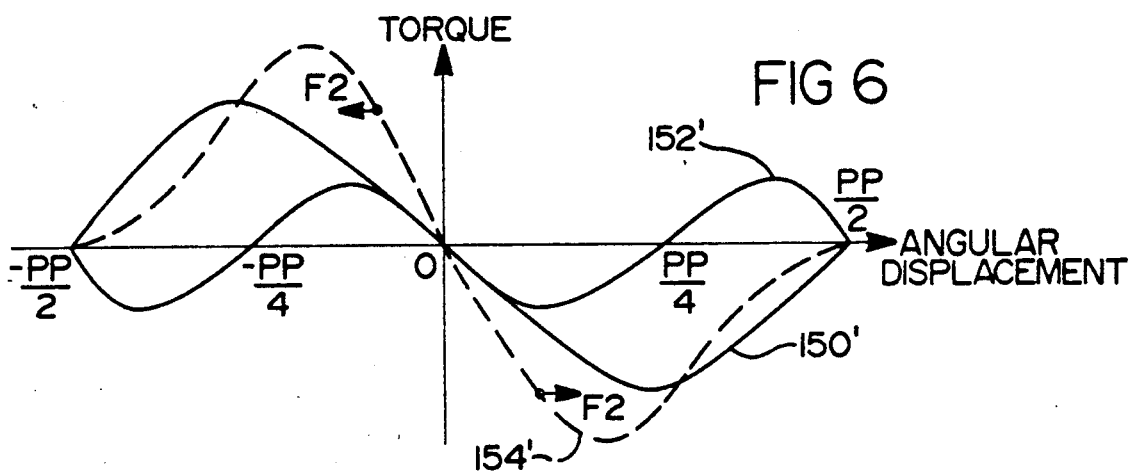

When the coil current is of a second polarity opposite to FIG. 5, the pole polarity reverses and the force on the ring magnet 140 also reverses. As shown in the torque-displacement diagram of FIG. 6, the trace 150' due to electromagnetic force on the magnet 140 and the trace 154' showing net force are reversed so that the force F2 is in a direction away from the zero displacement point. With this current polarity, stable equilibrium occurs at a displacement of PP/2 in either direction. Unstable equilibrium is attained at zero displacement.

The position +/−PP/4, however, is the preferred position of the permanent ring magnet 140 in the absence of any energization current in the coil 106. Then the teeth have no polarity and each ring magnet pole is attracted to a position aligned with the gaps between the teeth as shown in FIG. 4c. The positive slope of the trace 152 at the +/−PP/4 axis crossing indicates a condition of stable equilibrium. Thus, with no current, the magnet will be biased to a rest position displaced PP/4 in either direction from the zero displacement point.

Figure 7:
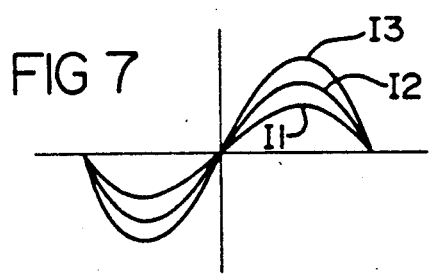
FIG. 7 is an actuator torque-displacement diagram for different current magnitudes.

FIG. 7 illustrates a family of torque-displacement curves due to electromagnetic force only for various currents in one direction. Current I3 is larger than I2 and current I2 is larger than I1. Thus, it can be seen that increased current causes increased torque for a given displacement.

The force or torque characteristics of the electromagnetic device leads to a number of possibilities of actuator configurations. One application is illustrated in the above U.S. Pat. No. 4,886,138 which makes use of the structure where both the pole pieces 120, 126 and the magnetic ring 140 rotate, and the magnetic forces are used to vary the steering input force of a vehicle power steering system. Other applications, using principally the FIG. 2 embodiment with stationary pole pieces 120, 126 and one output shaft 146 driven by the magnet ring 140, are shown schematically in FIGS. 8-10.

Figure 8:
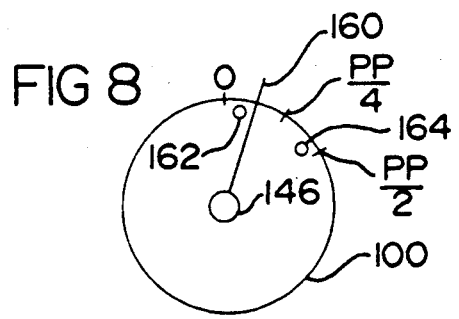
FIGS. 8-10 are schematic diagrams of various actuator configurations according to the invention.
Figure 9:
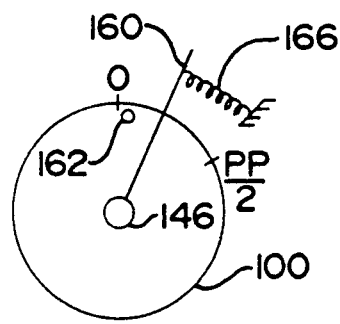
Figure 10:
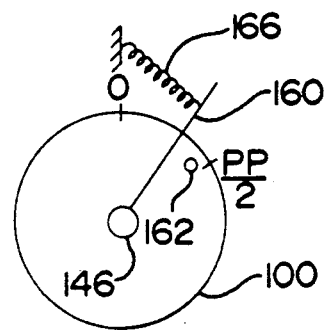

In FIGS. 8-10, the actuator 100 is shown in end view. The output shaft 146 carries a vane 160 to show the shaft displacement angle. Stops 162, 164 are used to restrain displacement of the magnet ring relative to the pole pieces to limit shaft rotation to the region of suitable characteristics. For convenience, current which forces the shaft toward the zero position is called positive current, and that which forces the shaft away from zero position is called negative current. To avoid ambiguity due to reversal of force direction when the torque curve passes through a zero crossing point, the angular travel of the shaft 146 is limited to a region between 0 and PP/2 exclusive of the end points.

FIG. 8 depicts an actuator 100 configuration which can be operated as a three position actuator or as a two position actuator. A stop 162 is positioned to the right of the zero displacement position, as defined in FIG. 4a, and a stop 164 is placed to the left of the PP/2 position. Then, when positive current is applied to the energizing coil, the shaft 146 is driven to the stop 162, and when negative current is applied, the shaft is driven to the stop 164, thus providing two positive actuator positions. A third position is attained by a zero current condition which allows the permanent magnet ring to move the shaft to the PP/4 position. Such an actuator could be used in the two position mode, for example, as an automotive door lock actuator.

FIG. 9 depicts an actuator 100 having a stop 162 to the right of the zero position, and a spring 166 under compression or other resilient element urging the shaft toward the stop and preventing shaft movement beyond the PP/2 point. The spring 1616, like the stop 162, restrains displacement of the magnet ring relative to the pole pieces. The application of negative current tends to counter the spring force to move the shaft away from the stop 162 until the actuator force balances the spring force. The actuator force is a function of current so that for a given spring rate the position of the shaft is a function of current. This type of actuator is useful in an automotive vehicle for positioning a throttle in response to an electrical signal.

The FIG. 10 actuator configuration is essentially the same as FIG. 9, except the spring 166 and stop 162 are reversed and positive current is required to balance the spring force.

It will thus be apparent, in view of the above explanation, that the actuator as a torque motor or magnetic spring is useful as a current controlled device to accomplish a controlled angularly limited displacement of an output shaft relative to either a stationary reference or a rotatable reference. The actuator thus controlled can, as a matter of design, be made to perform as a two or three position actuator or as a current magnitude controlled positioner operating against a linear spring.

The embodiments of the invention in which an exclusive property or privilege is claimed are defined as follows:

1. A rotary actuator having a limited angular motion comprising:
    an output shaft for rotation about an axis,
    a magnet ring mounted on the output shaft for rotation therewith, the ring having a plurality of poles magnetized in the radial direction,
    a stationary electromagnetic coil surrounding the output shaft,
    a magnetic circuit coupled to the coil and including a pair of spaced toothed pole pieces, and
    each toothed pole piece having a number of teeth equal to half the number of poles on the magnetic ring, the teeth surrounding the magnetic ring and being interdigitated to comprise a claw pole structure,
    whereby in the absence of energizing current in the coil, the magnet ring is torqued toward a first position with respect to the pole pieces, a coil current of a first polarity torques the magnet ring in one direction, and a coil current of an opposite polarity torques the magnet ring in an opposite direction to thereby control the output shaft.

2. The invention as defined in claim 1 wherein the toothed pole pieces are stationary.

3. The invention as defined in claim 1 wherein the toothed pole pieces are mounted for rotation together about the axis so that rotation of the toothed pole pieces is imposed on the magnet ring and output shaft in addition to the control effect of the energizing current.

4. A rotary actuator having a limited angular motion comprising:
    a support,
    an output shaft mounted in the support for rotation about an axis,
    a magnet ring mounted on the output shaft for rotation therewith, the ring having a plurality of poles magnetized in the radial direction,
    an electromagnetic coil mounted on the support,
    a magnetic circuit coupled to the coil and including a pair of toothed pole pieces mounted to the support,
    each toothed pole piece having a number of teeth equal to half the number of poles on the magnet ring, the teeth extending axially in a cylindrical array radially outboard of and adjacent to the magnet ring and being coupled in claw pole configuration, and
    means for restraining the relative displacement of the magnet ring relative to the toothed pole pieces,
    whereby in the absence of energizing current in the coil, the magnet ring is torqued toward a first position with respect to the pole pieces, a coil current of a first polarity torques the magnet ring in one direction, and a coil current of an opposite polarity torques the magnet ring in an opposite direction, to thereby control the output shaft.

5. The invention as defined in claim 4 wherein the restraining means comprises stop means to limit the rotation angle of the output shaft.

6. The invention as defined in claim 4 wherein the restraining means comprises resilient means coupled to the output shaft to produce a counter torque on the output shaft as a function of shaft angular position, whereby the position of the output shaft depends on the counter torque as well as the polarity and magnitude of the energizing current.

7. The invention as defined in claim 4 wherein the restraining means includes stops at either side of the first position to limit shaft movement to an angular displacement in either direction from the center position, whereby the actuator has three stable positions.

8. A rotary actuator having a limited angular motion comprising:

first and second coaxial relatively rotatable means, the first means including a permanent magnet ring magnetized axially with N poles, the second means including a pair of toothed pole pieces magnetically coupled to the magnet ring, each pole piece having N/2 teeth surrounding the magnet ring so that the ring and pole pieces form a permanent magnet circuit, the teeth of the respective pole pieces being interdigitated in a claw pole configuration so that magnetic flux developed by the magnet ring enters the pole pieces to develop a permanent magnet biasing force which is balanced when the magnet ring and the pole pieces are at a first relative position, and an electromagnetic circuit including an energizing coil and the pole pieces for passing flux developed by the coil through the magnet ring for developing a positive force on the magnet ring when the coil is energized in one direction and a negative force on the magnet ring when the coil is energized in an opposite direction.

9. The invention as defined in claim 8 including spring means for biasing the first and second means in a direction counter to the force developed by the electromagnetic circuit wherein the net force developed by the permanent magnet circuit and the electromagnet circuit is a function of displacement from center position and of the current magnitude so that the first and second means assume a relative position where the said net force is in equilibrium with the spring means force.

* * * * *